(12) United States Patent
Morikawa et al.

(10) Patent No.: US 10,112,180 B2
(45) Date of Patent: Oct. 30, 2018

(54) CERIA-ZIRCONIA COMPOSITE OXIDE, METHOD FOR PRODUCING THE SAME, AND CATALYST FOR PURIFYING EXHAUST GAS USING THE CERIA-ZIRCONIA COMPOSITE OXIDE

(71) Applicants: TOYOTA JIDOSHA KABUSHIKI KAISHA, Toyota-shi, Aichi-ken (JP); CATALER CORPORATION, Kakegawa-shi, Shizuoka-ken (JP)

(72) Inventors: Akira Morikawa, Nagakute (JP); Kae Konishi, Nagakute (JP); Toshitaka Tanabe, Nagakute (JP); Akihiko Suda, Nagakute (JP); Masahide Miura, Toyota (JP); Isao Chinzei, Toyota (JP); Hiromasa Suzuki, Toyota (JP); Akiya Chiba, Shizuoka (JP); Kosuke Iizuka, Kakegawa (JP)

(73) Assignees: TOYOTA JIDOSHA KABUSHIKI KAISHA, Aichi-ken (JP); CATALER CORPORATION, Kakegawa-shi, Shizuoka-ken (JP)

( * ) Notice: Subject to any disclaimer, the term of this patent is extended or adjusted under 35 U.S.C. 154(b) by 0 days.

(21) Appl. No.: 15/026,760

(22) PCT Filed: Oct. 2, 2014

(86) PCT No.: PCT/IB2014/001995
§ 371 (c)(1),
(2) Date: Apr. 1, 2016

(87) PCT Pub. No.: WO2015/049575
PCT Pub. Date: Apr. 9, 2015

(65) Prior Publication Data
US 2016/0250620 A1     Sep. 1, 2016

(30) Foreign Application Priority Data
Oct. 4, 2013 (JP) ................................. 2013-209190

(51) Int. Cl.
*B01J 23/10* (2006.01)
*C01G 25/00* (2006.01)
(Continued)

(52) U.S. Cl.
CPC .......... *B01J 23/10* (2013.01); *B01D 53/9445* (2013.01); *B01J 23/002* (2013.01); *B01J 23/63* (2013.01); *B01J 23/66* (2013.01); *B01J 35/002* (2013.01); *B01J 35/023* (2013.01); *B01J 37/02* (2013.01); *B01J 37/0201* (2013.01); *B01J 37/03* (2013.01); *B01J 37/04* (2013.01); *B01J 37/08* (2013.01); *C01F 17/0018* (2013.01); *C01G 25/00* (2013.01); *C04B 35/488* (2013.01); *C04B 35/6261* (2013.01); *C04B 35/6265* (2013.01); *C04B 35/62655* (2013.01); *C04B 35/62685* (2013.01); *B01D 2255/2063* (2013.01); *B01D 2255/407* (2013.01); *B01D 2255/908* (2013.01); *B01J 37/0036* (2013.01);
(Continued)

(58) Field of Classification Search
CPC . B01J 23/10; B01J 23/002; B01J 37/08; B01J 37/02; B01J 35/023; B01J 37/0201; B01J 37/03; B01J 37/04; C01F 17/0018; C01G 25/00; C04B 35/488; C04B 35/6261; C04B 35/6265; C04B 35/62655; C04B 35/62685
See application file for complete search history.

(56) References Cited

U.S. PATENT DOCUMENTS 5,571,492 A    11/1996    Yao et al.
5,580,536 A    12/1996    Yao et al.
(Continued)

FOREIGN PATENT DOCUMENTS

CN      1133821 A      10/1996
CN      11333821 A      10/1996
(Continued)

OTHER PUBLICATIONS

Sasaki et al., "Material Design and Crystal Structure Analysis Based on Ordered Arrangement of Ceria-Zirconia Solid Solution", Proceedings of 2006 Spring Annual Meeting of the Japan Institute of Metals, 2006, S4-27, p. 140 (total 4 pages).
(Continued)

*Primary Examiner* — James A Fiorito
(74) *Attorney, Agent, or Firm* — Sughrue Mion, PLLC (57) ABSTRACT

A ceria-zirconia composite oxide includes at least one of lanthanum, yttrium, and praseodymium. A rate of a total content of the at least one rare earth element to a total content of cerium and zirconium is 0.1 at % to 4.0 at %. A content of the rare earth element present in near-surface regions, which are at a distance of less than 50 nm from surfaces of primary particles of the ceria-zirconia composite oxide, accounts for 90 at % or more of the total content of the rare earth element. An average particle size of the primary particles of the ceria-zirconia composite oxide is 2.2 μm to 4.5 μm. After a predetermined durability test, the intensity ratio I(14/29) of a diffraction line at 2θ=14.5° to a diffraction line at 2θ=29° and the intensity ratio I(28/29) of a diffraction line at 2θ=28.5° to the diffraction line at 2θ=29° respectively satisfy the following conditions:

$I(14/29) \geq 0.02$, and $I(28/29) \leq 0.08$.

3 Claims, 4 Drawing Sheets

(51) Int. Cl.
| | |
|---|---|
| *C04B 35/488* | (2006.01) |
| *B01D 53/94* | (2006.01) |
| *C04B 35/626* | (2006.01) |
| *B01J 37/03* | (2006.01) |
| *B01J 37/04* | (2006.01) |
| *B01J 23/63* | (2006.01) |
| *B01J 23/66* | (2006.01) |
| *B01J 35/00* | (2006.01) |
| *B01J 35/02* | (2006.01) |
| *B01J 37/02* | (2006.01) |
| *B01J 23/00* | (2006.01) |
| *C01F 17/00* | (2006.01) |
| *B01J 37/08* | (2006.01) |
| *B01J 37/00* | (2006.01) |

(52) U.S. Cl.
CPC ........ *B01J 37/0063* (2013.01); *B01J 2523/00* (2013.01); *C01P 2002/36* (2013.01); *C01P 2002/50* (2013.01); *C01P 2002/74* (2013.01); *C01P 2002/85* (2013.01); *C01P 2004/04* (2013.01); *C01P 2004/61* (2013.01); *C01P 2004/64* (2013.01); *C01P 2006/12* (2013.01); *C01P 2006/37* (2013.01); *C04B 2235/3224* (2013.01); *C04B 2235/3225* (2013.01); *C04B 2235/3227* (2013.01); *C04B 2235/3229* (2013.01); *C04B 2235/3244* (2013.01); *C04B 2235/443* (2013.01); *C04B 2235/549* (2013.01); *C04B 2235/5436* (2013.01); *C04B 2235/604* (2013.01); *C04B 2235/652* (2013.01); *C04B 2235/656* (2013.01); *C04B 2235/6567* (2013.01); *C04B 2235/75* (2013.01); *C04B 2235/76* (2013.01); *C04B 2235/762* (2013.01); *Y02T 10/22* (2013.01)

(56) References Cited

U.S. PATENT DOCUMENTS

| | | | |
|---|---|---|---|
| 5,582,785 | A | 12/1996 | Yao et al. |
| 6,605,565 | B1 | 8/2003 | Zhang et al. |
| 9,376,327 | B2 * | 6/2016 | Morikawa ................ B01J 35/04 |
| 2002/0160912 | A1 | 10/2002 | Morikawa et al. |
| 2003/0050189 | A1 | 3/2003 | Morikawa et al. |
| 2004/0028589 | A1 * | 2/2004 | Reisinger ............. B01D 53/864 423/240 S |
| 2004/0126298 | A1 | 7/2004 | Stark et al. |
| 2007/0155624 | A1 | 7/2007 | Wakita et al. |
| 2009/0124491 | A1 | 5/2009 | Miura et al. |
| 2011/0020201 | A1 | 1/2011 | Luo et al. |
| 2013/0029840 | A1 | 1/2013 | Morikawa et al. |
| 2014/0037524 | A1 | 2/2014 | Mikita et al. |
| 2014/0038818 | A1 | 2/2014 | Nakahara et al. |
| 2014/0205522 | A1 | 7/2014 | Ifrah et al. |
| 2015/0298099 | A1 | 10/2015 | Saito et al. |

FOREIGN PATENT DOCUMENTS

| | | |
|---|---|---|
| CN | 101146612 A | 3/2008 |
| CN | 103038175 A | 4/2013 |
| EP | 0 706 980 A1 | 4/1996 |
| EP | 0 708 066 A1 | 4/1996 |
| EP | 0 709 351 A1 | 5/1996 |
| EP | 1175935 A2 | 1/2002 |
| EP | 1 287 876 A2 | 3/2003 |
| EP | 2671638 A1 | 12/2013 |
| JP | 8-103650 A | 4/1996 |
| JP | 8-109020 A | 4/1996 |
| JP | 8-109021 A | 4/1996 |
| JP | 2002-248347 A | 9/2002 |
| JP | 2002-331238 A | 11/2002 |
| JP | 2003-277059 A | 10/2003 |
| JP | 2009-84061 A | 4/2009 |
| JP | 2011-219329 A | 11/2011 |
| JP | 2012-228628 A | 11/2012 |
| WO | 02/072256 A2 | 9/2002 |
| WO | 2006/030763 A1 | 3/2006 |
| WO | 2011/129460 A1 | 10/2011 |
| WO | 2012/105454 A1 | 8/2012 |
| WO | 2012/120349 A1 | 9/2012 |
| WO | 2012/171947 A1 | 12/2012 |
| WO | 2014/080695 A1 | 5/2014 |

OTHER PUBLICATIONS

Sasaki, "Study on Oxygen Storage/ Release Performance and Crystal Structure of Ceria-Zirconia Compounds with Different Ce/Zr Ratios", Thesis, Chapter 7, 2004, pp. 150-170 (total 39 pages).

Masahiro Sugiura, "Oxygen storage materials for automotive catalysts: ceria-zirconia solid solutions", Catalysis Surveys from Asia, Apr. 2003, vol. 7, No. 1, pp. 77-87.

Haruo Kishimoto et al., "Crystal structure of metastable $_K$—CeZrO$_4$ phase possessing an ordered arrangement of Ce and Zr ions", Journal of Alloys and Compounds, 2000, vol. 312, pp. 94-103.

Toshiyuki Masui et al., "Reduction Behavior of CeO$_2$—ZrO$_2$ Solid Solution Prepared from Cerium Zirconyl Oxalate", Chem. Mater., 1998, vol. 10, No. 12, pp. 4005-4009.

Akihiko Suda et al., "Improvement of Oxygen Storage Capacity of CeO$_2$—ZrO$_2$ Solid Solution by Heat Treatment in Reducing Atmosphere", Journal of the Ceramic Society of Japan, 2002, vol. 110, No. 2, pp. 126-130.

Tsuyoshi Sasaki et al., "Flaming Oxidation of Reduced CeO$_2$—ZrO$_2$ Solid Solution in the Near-Room-Temperature Range", Journal of the Ceramic Society of Japan, 2002, vol. 110, No. 10, pp. 899-903.

Tsuyoshi Sasaki et al., "Oxygen Absorption Behavior of Ce$_2$Zr$_2$O$_{7+x}$ and Formation of Ce$_2$Zr$_2$O$_{7.5}$", Journal of the Ceramic Society of Japan, 2003, vol. 111, No. 6, pp. 382-385.

Non-Final Office Action dated May 20, 2015 from U.S. Patent & Trademark Office in U.S. Appl. No. 13/640,237.

* cited by examiner

CERIA-ZIRCONIA COMPOSITE OXIDE, METHOD FOR PRODUCING THE SAME, AND CATALYST FOR PURIFYING EXHAUST GAS USING THE CERIA-ZIRCONIA COMPOSITE OXIDE

BACKGROUND OF THE INVENTION

1. Field of the Invention

The present invention relates to a ceria-zirconia composite oxide, a method for producing the same, and a catalyst for purifying exhaust gas using the ceria-zirconia composite oxide.

2. Description of Related Art

In the related art, composite oxides containing various metal oxides have been utilized as a support, a co-catalyst, and the like for a catalyst for purifying exhaust gas. As a metal oxide in such a composite oxide, ceria is favorably used because ceria is capable of storing and releasing oxygen (that is, has an oxygen storage capacity) according to the oxygen partial pressure in the atmosphere. In addition, recently, various kinds of composite oxides containing ceria have been studied, and various ceria-zirconia composite oxides and methods for producing the same have been disclosed.

Japanese Patent Application Publication No. 2011-219329 (JP 2011-219329 A) discloses an example of a ceria-zirconia composite oxide containing a composite oxide of ceria and zirconia. According to this related art, a content ratio of cerium to zirconium in the composite oxide is set in a range from 43:57 to 48:52 by molar ratio ([cerium]:[zirconium]). In addition, an intensity ratio I(14/29) of a diffraction line at $2\theta=14.5°$ to a diffraction line at $2\theta=29°$ and an intensity ratio I(28/29) of a diffraction line at $2\theta=28.5°$ to the diffraction line at $2\theta=29°$, which intensity ratios I(14/29) and I(28/29) are calculated from an X-ray diffraction pattern obtained by an X-ray diffraction measurement using CuKα after heating under a temperature condition of 1100° C. in air for 5 hours, respectively satisfy the following conditions: $I(14/29) \geq 0.015$; and $I(28/29) \leq 0.08$. According to this related art, it is possible to provide a ceria-zirconia composite oxide having high heat resistance and being capable of exhibiting excellent oxygen storage capacity even after exposure to a high temperature for a long period of time. However, recently, demand characteristics for a catalyst for purifying exhaust gas have been increasing. Therefore, there is required a ceria-zirconia composite oxide having sufficiently higher oxygen storage capacity (OSC) and sufficiently higher heat resistance at the same time and capable of exhibiting more sufficiently excellent oxygen storage capacity (OSC) even after exposure to a high temperature for a long period of time.

In addition, International Publication No. WO2012/105454 discloses a catalyst for purifying exhaust gas including: a ceria-zirconia composite oxide (A) having a pyrochlore structure; and a ceria-zirconia composite oxide (B) having a cubic crystal structure. At least a part of the ceria-zirconia composite oxide (A) is composited with the ceria-zirconia composite oxide (B). However, in the catalyst for purifying exhaust gas disclosed in International Publication No. WO2012/105454, surface structures of primary particles of the ceria-zirconia composite oxide (A) having a pyrochlore structure are unstable, an effect of suppressing deterioration of an oxygen storing material is not sufficient, oxygen absorbing and releasing performance after exposure to a high temperature is not always sufficient, and durability is not sufficient.

SUMMARY OF THE INVENTION

The invention provides a ceria-zirconia composite oxide, a method for producing the same, and a catalyst for purifying exhaust gas using the ceria-zirconia composite oxide, the ceria-zirconia composite oxide having sufficiently excellent oxygen storage capacity (OSC) and sufficiently excellent heat resistance at the same time and being capable of exhibiting sufficiently excellent oxygen storage capacity (OSC) even after exposure to a high temperature for a long period of time.

The present inventors have thoroughly, studied in order to achieve the above-described object and have found that, by adding a specific rare earth element; which is capable of suppressing phase transformation of a pyrochlore structure of $CeO_2$—$ZrO_2$ in the ceria-zirconia composite oxide, to near-surface regions of primary particles of a ceria-zirconia composite oxide such that specific conditions are satisfied, the following effects can be obtained: the oxygen storage capacity and the heat resistance of the obtained ceria-zirconia composite oxide are sufficiently excellent and highly well-balanced; and sufficiently excellent oxygen storage capacity can be exhibited even after exposure to a high temperature for a long period of time. Based on the above finding, the invention has been completed.

A first aspect of the invention is a ceria-zirconia composite oxide containing a composite oxide of ceria and zirconia. The ceria-zirconia composite oxide includes at least one rare earth element selected from the group consisting of lanthanum, yttrium, and praseodymium. A rate of a total content of the at least one rare earth element to a total content of cerium and zirconium in the ceria-zirconia composite oxide is 0.1 at % to 4.0 at %. A content of the rare earth element present in near-surface regions accounts for 90 at % or more of the total content of the rare earth element, the near-surface regions being at a distance of less than 50 nm from surfaces of primary particles of the ceria-zirconia composite oxide. A content ratio of cerium to zirconium in the ceria-zirconia composite oxide is in a range from 43:57 to 48:52 by molar ratio. An average particle size of the primary particles of the ceria-zirconia composite oxide is 2.2 μm to 4.5 μm. An intensity ratio I(14/29) of a diffraction line at $2\theta=14.5°$ to a diffraction line at $2\theta=29°$ and an intensity ratio I(28/29) of a diffraction line at $2\theta=28.5°$ to the diffraction line at $2\theta=29°$ respectively satisfy the following conditions:

$I(14/29) \geq 0.02$; and $I(28/29) \leq 0.08$, wherein the intensity ratio I(14/29) and the intensity ratio I(28/29) are calculated from an X-ray diffraction pattern of the ceria-zirconia composite oxide, the X-ray diffraction pattern obtained by an X-ray diffraction measurement using CuKα after heating the ceria-zirconia composite oxide under a temperature condition of 1100° C. in air for 5 hours.

A second aspect of the invention is a method for producing a ceria-zirconia composite oxide containing a composite oxide of ceria and zirconia. The method includes: preparing ceria-zirconia composite oxide powder in which a content ratio of cerium to zirconium is in a range from 43:57 to 48:52 by molar ratio and an average particle size of primary particles of the ceria-zirconia composite oxide powder is 2.2 μm to 4.5 μm; allowing at least one rare earth element selected from the group consisting of lanthanum, yttrium, and praseodymium to be supported on the ceria-zirconia composite oxide powder; and firing the ceria-zirconia composite oxide powder on which the rare earth element is supported at 600° C. to 1200° C. to obtain the ceria-zirconia composite oxide according to the first aspect of the invention.

A catalyst for purifying exhaust gas according to a third aspect of the invention includes the ceria-zirconia composite oxide according to the first aspect of the invention.

The intensity ratio I(14/29) and the intensity ratio I(28/29) described in the aspects of the invention each refer to an intensity ratio of a diffraction line at 2θ=14.5° to a diffraction line at 2θ=29° and an intensity ratio of a diffraction line at 2θ=28.5° to the diffraction line at 2θ=29°, which intensity ratios are calculated from an X-ray diffraction pattern obtained by an X-ray diffraction measurement using CuKα after heating a ceria-zirconia composite oxide, which is a measurement target, under a temperature condition of 1100° C. in air for 5 hours. The X-ray diffraction measurement is performed with CuKα rays using "RINT 2100" (trade name, manufactured by Rigaku Corporation) as a measuring device under conditions of 40 kV, 30 mA, and 2θ=2°/min.

Here, the diffraction line at 2θ=14.5° is a diffraction line derived from the (111) plane of the ordered phase (κ phase). The diffraction line at 2θ=29° is a diffraction line derived from the (222) plane of the ordered phase and overlapping a diffraction line derived from the (111) plane of the cubic crystal phase of the ceria-zirconia solid solution (CZ solid solution). Thus, by calculating the intensity ratio I(14/29) that is the intensity ratio between the two diffraction lines, an index indicating the ratio (remaining ratio) of the ordered phase maintained is defined. When the intensity of a diffraction line is calculated, an average diffraction line intensity at 2θ=10° to 12° which is a background value is subtracted from a value of each diffraction line intensity. In addition, a κ phase ($Ce_2Zr_2O_8$) which is completely filled with oxygen and a pyrochlore phase ($Ce_2Zr_2O_7$) from which oxygen is completely removed are each a completely ordered phase. The intensity ratio I(14/29) of the κ phase and the intensity ratio I(14/29) of the pyrochlore phase are respectively 0.04 and 0.05, which intensity ratios are calculated from the corresponding PDF cards (PDF2: 01-070-4048 for the κ phase, PDF2: 01-075-2694 for the pyrochlore phase). Further, the ordered phase, that is, a crystal phase having an ordered structure formed of cerium ions and zirconium ions has an arrangement structure (φ' phase (which is the same phase as the κ phase) type ordered phase: a superlattice structure that occurs in a fluorite structure) of a crystal which has peaks at 2θ-angle positions of 14.5°, 28°, 37°, 44.5° and 51° in an X-ray diffraction pattern obtained by an X-ray diffraction measurement using CuKα. The "peak" herein refers to one having a height of 30 cps or more, the height being from the baseline to the top of the peak.

In addition, the diffraction line at 2θ=28.5° is a diffraction line derived from the (111) plane of $CeO_2$ alone. Thus, by calculating the intensity ratio I(28/29) that is the intensity ratio of the diffraction line at 2θ=28.5° to the diffraction line at 2θ=29, an index indicating the degree of phase separation of $CeO_2$ from a composite oxide is defined.

The present inventors presumes that the reason why the above-described object can be achieved by the ceria-zirconia composite oxide according to the aspects of the invention is as follows. In the pyrochlore phase ($Ce_2Zr_2O_7$) of $CeO_2$—$ZrO_2$ in the ceria-zirconia composite oxide, phase change with the κ phase occurs according to the oxygen partial pressure in the gas phase, and oxygen storage capacity (OSC) is exhibited. When a ceria-zirconia composite oxide having this $Ce_2Zr_2O_7$ type pyrochlore phase is exposed to an oxidizing atmosphere at a high temperature, since the $Ce_2Zr_2O_7$ type pyrochlore phase is the metastable phase, the structure thereof returns to the fluorite structure starting from surfaces of primary particles. As a result, oxygen storage capacity (OSC) deteriorates. According to the aspects, the ceria-zirconia composite oxide contains at least one rare earth element (RE) selected from the group consisting of lanthanum (La), yttrium (Y), and praseodymium (Pr). Using the rare earth element (RE) ions and zirconium ions, a $RE_2Zr_2O_7$ type pyrochlore structure can be formed, and a crystal phase having an ordered structure can be obtained. This $RE_2Zr_2O_7$ type pyrochlore structure is the stable phase and has higher heat resistance than that of the $Ce_2Zr_2O_7$ type pyrochlore structure. According to the aspects of the invention, an ordered phase having a $RE_2Zr_2O_7$ type pyrochlore structure is formed in near-surface regions of primary particles of the ceria-zirconia composite oxide. Therefore, phase transformation of the pyrochlore structure of $CeO_2$—$ZrO_2$ is suppressed, heat resistance at high temperature is improved, and sufficiently high oxygen absorbing and releasing capacity is exhibited even after exposure to a high temperature. Based on this finding, the present inventors presumes that: the oxygen storage capacity and the heat resistance of the ceria-zirconia composite oxide are sufficiently excellent and highly well-balanced; and sufficiently excellent oxygen storage capacity can be exhibited even after exposure to a high temperature for a long period of time.

According to the aspects of the invention, it is possible to provide a ceria-zirconia composite oxide, a method for producing the same, and a catalyst for purifying exhaust gas using the ceria-zirconia composite oxide, the ceria-zirconia composite oxide having sufficiently excellent oxygen storage capacity (OSC) and sufficiently excellent heat resistance at the same time and being capable of exhibiting sufficiently excellent oxygen storage capacity (OSC) even after exposure to a high temperature for a long period of time.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, the invention will be described in detail using preferred embodiments thereof.

First, a ceria-zirconia composite oxide according to an embodiment of the invention will be described. It is necessary that the ceria-zirconia composite oxide according to the embodiment contain at least one rare earth element selected from the group consisting of lanthanum (La), yttrium (Y), and praseodymium (Pr). In addition, a rate of a total content of the at least one rare earth element to a total content of cerium and zirconium in the ceria-zirconia composite oxide is necessarily 0.1 at % to 4.0 at % and preferably 0.25 at % to 2.5 at %. When the content ratio of at least one rare earth element selected from the group consisting of lanthanum (La), yttrium (Y), and praseodymium (Pr) is less than the lower limit, a function of maintaining I(14/29) and OSC after a durability test tends to decrease, and thus an effect of obtaining excellent OSC and high heat resistance at the same time and exhibiting excellent OSC even after exposure to a high temperature for a long period of time cannot be sufficiently obtained. On the other hand, when the content ratio of the rare earth element is more than the upper limit, the function of maintaining I(14/29) and OSC after a durability test tends to decrease, and thus an effect of exhibiting excellent OSC cannot be sufficiently obtained. These rare earth elements may be used alone or in a combination of two or more kinds. In addition, in the ceria-zirconia composite oxide, different additive elements may be added to the near-surface regions and the other regions.

In addition, in the ceria-zirconia composite oxide according to the embodiment, this rare earth element may be present in the solid solution state, dispersion state, or the like. In particular, in order to allow the rare earth element to exhibit the effects of the embodiment more significantly, it is preferable that at least a part of the rare earth element be solid-solubilized in the ceria-zirconia composite oxide.

In addition, in the ceria-zirconia composite oxide according to the embodiment, it is necessary that the content of at least one rare earth element selected from the group consisting of lanthanum, yttrium, and praseodymium present in near-surface regions which are at a distance of less than 50 nm from surfaces of primary particles of the ceria-zirconia composite oxide account for 90 at % or more of the total content of the rare earth element. It is more preferable that the content of the rare earth element present in near-surface regions which are at a distance of less than 30 nm from the surfaces account for 80 at % or higher of the total content of the rare earth element. When a distribution of the rare earth element is out of the above-described limitation, a sufficient structure stabilizing effect cannot be exhibited. In the ceria-zirconia composite oxide according to the embodiment, when the content of the rare earth element present in the near-surface regions accounts for 90 at % or more of the total content of the rare earth element, the dispersion morphology of the rare earth element is not particularly limited. That is, although it is preferable that substantially all the primary particles of the ceria-zirconia composite oxide present in the near-surface regions contain the rare earth element, some primary particles may not contain the rare earth element within a range not impairing the effects of the embodiment.

The content and the content ratio of the rare earth element present in the near-surface regions of the ceria-zirconia composite oxide can be confirmed by performing composition analysis using, for example, EDX (energy-dispersive x-ray spectrometer) or SIMS (secondary ion mass spectrometer) and comparing the content ratios of additive elements between the near-surface regions of the primary particles and the other regions. Alternatively, the content and the content ratio of the rare earth element present in the near-surface regions may be confirmed with a method using the elution of the rare earth element added. Specifically, the rare earth element added to the near-surface regions is eluted when coming into contact with an acidic solution such as a nitric acid aqueous solution. Accordingly, the content of the rare earth element present in the near-surface regions can be confirmed by measuring the content of the rare earth element eluted in a nitric acid aqueous solution when the ceria-zirconia composite oxide is brought into contact with the nitric acid aqueous solution. More specifically, the content of the rare earth element present in the near-surface regions can be confirmed, for example, by. adding 10 ml of 1N nitric acid aqueous solution to 0.1 g of the ceria-zirconia composite oxide, stirring the solution at room temperature for 2 hours to allow additive elements present in the near-surface regions to be eluted, and measuring the content of the eluted additive elements by chemical analysis.

Further, in the ceria-zirconia composite oxide according to the embodiment, a content ratio of cerium to zirconium is necessarily in a range from 43:57 to 48:52 by molar ratio and preferably in a range of 44:56 to 48:52. When the content ratio of cerium is less than the lower limit, a decrease in oxygen storage capacity caused by the zirconium-rich composition exceeds the stability improvement effect of the composite oxide obtained by phase separation of ceria being suppressed. Therefore, oxygen storage capacity after a high-temperature durability test is insufficient. On the other hand, when the content ratio of cerium is more than the upper limit, the stability improvement effect of the composite oxide obtained by phase separation of ceria being suppressed cannot be obtained. Therefore, oxygen storage capacity after a high-temperature durability test is insufficient.

In addition, in the embodiment, an average particle size of the primary particles of the ceria-zirconia composite oxide is necessarily 2.2 μm to 4.5 μm, preferably 2.5 μm to 4.5 μm, and more preferably 2.5 μm to 4.0 μm. When the average particle size of the primary particles is less than the lower limit, the heat resistance of the $CeO_2$—$ZrO_2$ pyrochlore structure tends to decrease. On the other hand, when the average particle size of the primary particles is more than the upper limit, the time required for the elution of oxygen tends to excessively increase.

The average particle size of the primary particles of the ceria-zirconia composite oxide according to the embodiment can be obtained by measuring particle sizes of arbitrary 50 primary particles through the observation of a scanning electron microscopy (SEM) image and calculating an average value of the particle sizes. If a cross-section of a particle is not circular, the diameter of a minimum circumscribed circle is measured.

In addition, the particle sizes of the primary particles, the composition and structure of each particle, the aggregate state of secondary particles, and the like can be confirmed by observing or analyzing the ceria-zirconia composite oxide using an appropriate combination of SEM (scanning electron microscope), TEM (transmission electron microscope), FE-STEM (field emission scanning transmission electron microscope), HR-TEM (high-resolution transmission electron microscope), EDX (energy-dispersive x-ray spectrometer), XPS (X-ray photoelectron spectrometer), and the like.

Further, the above-described intensity ratio I(14/29) of the ceria-zirconia composite oxide according to the embodiment is necessarily 0.02 or more, preferably 0.030 or more, and more preferably 0.033 or more. When the intensity ratio I(14/29) is less than the lower limit, the ratio of the ordered phase maintained is low, and oxygen storage capacity after a high-temperature durability test is insufficient. The upper limit of the above-described intensity ratio I(14/29) is not particularly limited but is preferably 0.05 or less from the viewpoint that the intensity ratio I(14/29) of the pyrochlore phase calculated from the PDF card (01-075-2694) is set as the upper limit.

In addition, the above-described intensity ratio I(28/29) of the ceria-zirconia composite oxide according to the embodiment is necessarily 0.08 or less, preferably 0.06 or less, and more preferably 0.04 or less. When the intensity ratio I(28/29) is more than the upper limit, phase separation of ceria is not sufficiently suppressed, and oxygen storage capacity after a high-temperature durability test is insufficient. The lower limit of the intensity ratio I(28/29) is not particularly limited, and the lower the lower limit, the better.

In the ceria-zirconia composite oxide according to the embodiment, the content ratio of the ordered phase (the $Ce_2Zr_2O_7$ type pyrochlore phase and the $RE_2Zr_2O_7$ type pyrochlore phase) to all the crystal phases which is determined by the peak intensity ratio of the X-ray diffraction pattern is preferably 50% to 100% and more preferably 80% to 100%. When the content ratio of the ordered phase is less than the lower limit, the effect of suppressing deterioration of the oxygen storage capacity of the composite oxide and the heat resistance tend to decrease. In the ordered phase, the content ratio of the $RE_2Zr_2O_7$ type pyrochlore structure is preferably 0.1% to 8.0% and more preferably 0.8% to 5.0%. When the content ratio of the $RE_2Zr_2O_7$ type pyrochlore structure in the ordered phase is less than the lower limit, the deterioration suppressing effect and the heat resistance tend to decrease. On the other hand, when the content ratio of the $RE_2Zr_2O_7$ type pyrochlore structure is more than the upper limit, oxygen storage capacity tends to decrease.

In addition, the ceria-zirconia composite oxide according to the embodiment may further contain at least one element selected from the group consisting of rare earth elements other than cerium, lanthanum, yttrium, and praseodymium and alkaline earth elements. By containing such an element, the ceria-zirconia composite oxide according to the embodiment tends to exhibit higher exhaust gas purification capacity when being used as a support of a catalyst for purifying exhaust gas. Examples of the rare earth elements other than cerium, lanthanum, yttrium, and praseodymium include scandium (Sc), neodymium (Nd), samarium (Sm), gadolinium (Gd), terbium (Tb), dysprosium (Dy), ytterbium (Yb), and lutetium (Lu). Among these, Nd or Sc is preferable and Nd is more preferable from the viewpoint that, when a noble metal is supported thereon, the interaction with the noble metal increases and the affinity thereto tends to increase. In addition, examples of the alkaline earth metals include magnesium (Mg), calcium (Ca), strontium (Sr), barium (Ba), and radium (Ra). Among these, Mg, Ca, or Ba is preferable from the viewpoint that, when a noble metal is supported thereon, the interaction with the noble metal increases and the affinity thereto tends to increase. The rare earth elements other than cerium, lanthanum, yttrium, and praseodymium and the alkaline earth metals having low electronegativity interacts strongly with a noble metal, and accordingly binds to the noble metal through oxygen in an oxidizing atmosphere, and vaporization and sintering of the noble metal are suppressed. Thus, there is a tendency that deterioration of the noble metal, which is an active site during purification of exhaust gas, can be suppressed sufficiently.

Further, when the ceria-zirconia composite oxide according to the embodiment further contains at least one element selected from the group consisting of rare earth elements other than cerium, lanthanum, yttrium, and praseodymium and alkaline earth elements, the content thereof in the ceria-zirconia composite oxide is preferably 1 mass % to 20 mass % and more preferably 3 mass % to 7 mass %. When the content of the element is less than the lower limit, and when the noble metal is supported on the obtained composite oxide, it tends to be difficult to sufficiently improve the interaction with the noble element. On the other hand, when the content of the element is more than the upper limit, oxygen storage capacity tends to decrease.

Further, the specific surface area of the ceria-zirconia composite oxide is not particularly limited but is preferably 0.01 $m^2/g$ to 20 $m^2/g$ and more preferably 0.05 $m^2/g$ to 10 $m^2/g$. When the specific surface area is less than the lower limit, the interaction with a noble metal decreases, and oxygen storage capacity tends to decrease. When the specific surface area is more than the upper limit, the number of particles having a small particle size increases, and heat resistance tends to decrease. The specific surface area can be calculated from an adsorption isotherm as a BET specific surface area using a BET isotherm adsorption equation.

Next, a method according to an embodiment of the invention for producing the ceria-zirconia composite oxide according to the embodiment will be described. In the method for producing a ceria-zirconia composite oxide according to the embodiment, ceria-zirconia composite oxide powder in which a content ratio of cerium to zirconium is in a range from 43:57 to 48:52 by molar ratio and an average particle size of primary particles is 2.2 μm to 4.5 μm is prepared (ceria-zirconia composite oxide powder preparing step).

A method for preparing the ceria-zirconia composite oxide powder according to the embodiment is not particularly limited. For example, a method may be adopted, the method including: preparing ceria-zirconia solid solution powder using a coprecipitation method such that the content ratio of cerium to zirconium is within the above-described range; molding the ceria-zirconia solid solution powder; and heating the molded article under reducing conditions to obtain the ceria-zirconia composite oxide powder according to the embodiment.

For example, in the method for preparing the ceria-zirconia composite oxide powder according to the embodiment, ceria-zirconia solid solution powder in which a content ratio of cerium to zirconium is in a range from 43:57 to 48:52 by molar ratio is compression-molded under a pressure of 400 $kgf/cm^2$ to 3500 $kgf/cm^2$, followed by a reduction treatment under a temperature condition of 1450° C. to 2000° C. to obtain the ceria-zirconia composite oxide powder.

In the solid solution powder (ceria-zirconia solid solution powder) containing ceria and zirconia according to a specific example of the invention, a content ratio of cerium to zirconium is necessarily in a range from 43:57 to 48:52 by molar ratio. When the content ratio of cerium in the ceria-zirconia solid solution powder is less than the lower limit, a decrease in oxygen storage capacity caused by the zirconium-rich composition of the obtained ceria-zirconia composite oxide exceeds the stability improvement effect of the composite oxide obtained by phase separation of ceria being suppressed. Therefore, oxygen storage capacity after a high-temperature durability test is insufficient. On the other hand, when the content ratio of cerium is more than the upper limit, the stability improvement effect of the composite oxide obtained by phase separation of ceria being suppressed cannot be obtained in the obtained ceria-zirconia composite oxide. Therefore, oxygen storage capacity after a high-temperature durability test is insufficient. As the ceria-zirconia solid solution powder, a solid solution in which ceria and zirconia are mixed at an atomic level is preferable from the viewpoint of sufficiently forming the ordered phase. In addition, an average primary particle size of the ceria-zirconia solid solution powder is preferably about 2 nm to 100 nm. When the average primary particle size of the ceria-zirconia solid solution powder is less than the lower limit, the solid solution of ceria and zirconia in the powder does not sufficiently progress and it tends to be difficult to obtain the ordered phase. On the other hand, when the average primary particle size of the ceria-zirconia solid solution powder is more than the upper limit, the contact state between primary particles during the compression-molding deteriorates and the particle growth during the reduction treatment tends to be insufficient.

In addition, a method for producing the ceria-zirconia solid solution powder is not particularly limited. For example, a method may be used in which the solid solution powder is produced using a so-called coprecipitation method such that the content ratio of cerium to zirconium is within the above-described range. In the coprecipitation method, for example, a coprecipitate is produced in the presence of ammonia using an aqueous solution containing a salt (for example, a nitrate) of cerium and a salt (for example, a nitrate) of zirconium. Next, the obtained precipitate is filtered, washed, and dried followed by firing and crushing with a crusher such as a ball mill to obtain the ceria-zirconia solid solution powder. The aqueous solution containing a salt of cerium and a salt of zirconium is prepared such that the content ratio of cerium to zirconium in the obtained solid solution powder is within a predetermined range. In addition, optionally, a salt of at least one element selected from the group consisting of rare earth elements and alkaline earth elements, a surfactant (for example, a non-ionic surfactant), and the like may be added to the aqueous solution.

Next, in the specific example, the ceria-zirconia solid solution powder is compression-molded under a pressure of 400 kgf/cm$^2$ to 3500 kgf/cm$^2$ (preferably 500 kgf/cm$^2$ to 3000 kgf/cm$^2$). When the pressure during the compression-molding step is less than the lower limit, the packing density of the powder is not sufficiently improved, and thus crystal growth during the reduction treatment does not sufficiently progress. As a result, oxygen storage capacity after a high-temperature durability test of the obtained ceria-zirconia composite oxide is insufficient. On the other hand, when the pressure during the compression-molding step is more than the upper limit, phase separation of ceria easily progresses. As a result, the oxygen storage capacity after a high-temperature durability test of the obtained ceria-zirconia composite oxide is insufficient. A compression-molding method is not particularly limited, and a well-known compression-molding method such as isostatic pressing can be appropriately adopted.

Next, in the specific example, after the compression-molding, the ceria-zirconia solid solution powder molded article is heated under a reduction condition at a temperature of 1450° C. to 2000° C. (preferably 1600° C. to 1900° C.) for 0.5 hours to 24 hours (preferably 1 hour to 10 hours) as a reduction treatment. As a result, the ceria-zirconia composite oxide powder according to the embodiment is obtained. When the temperature of the reduction treatment is lower than the lower limit, the stability of the ordered phase is low. As a result, the oxygen storage capacity after a high-temperature durability test of the obtained ceria-zirconia composite oxide is insufficient. On the other hand, when the temperature of the reduction treatment is higher than the upper limit, a balance between energy (for example, electric power) required for the reduction treatment and performance improvement is poor. In addition, when the heating time during the reduction treatment is shorter than the lower limit, the production of the ordered phase tends to be insufficient. On the other hand, when the heating time during the reduction treatment is longer than the upper limit, a balance between energy (for example, electric power) required for the reduction treatment and performance improvement is poor.

In addition, a method for the reduction treatment is not particularly limited as long as the solid solution powder can be heated in a reducing atmosphere under a predetermined temperature condition. For example, a reduction treatment method may be used, the method including: placing the solid solution powder in a vacuum heating furnace; vacuuming the furnace; changing the inner atmosphere of the furnace to a reducing atmosphere by allowing reducing gas to flow into the furnace; and heating the furnace under a predetermined temperature condition. Alternatively, another reduction treatment method may be used, the method including: placing the solid solution powder in a graphite furnace; vacuuming the furnace; heating the furnace under a predetermined temperature condition to produce reducing gas such as CO or HC from a furnace body, a heating fuel, and the like; and changing the inner atmosphere of the furnace to a reducing atmosphere using the produced reducing gas. Alternatively, still another reduction treatment method may be used, the method including: placing the solid solution powder in a crucible filled with activated carbon; heating the crucible under a predetermined temperature condition to produce reducing gas such as CO or HC from the active carbon; and changing the inner atmosphere of the crucible to a reducing atmosphere using the produced reducing gas.

The reducing gas used to achieve the reducing atmosphere is not particularly limited, and reducing gas such as CO, HC, $H_2$ or other hydrocarbon gas can be appropriately used. In addition, among the examples of the reducing gas, reducing gas not containing carbon (C) is more preferably used from the viewpoint of preventing the production of a by-product such as zirconium carbide (ZrC) when the reduction treatment is performed at a high temperature. When the reducing gas not containing carbon (C) is used, the reduction treatment can be performed under a higher temperature condition which is close to a melting point of zirconium or the like. Therefore, the structure stability of the crystal phase can be sufficiently improved.

In the specific example, after the reduction treatment, it is preferable that the ceria-zirconia composite oxide powder be oxidized. By the ceria-zirconia composite oxide powder being oxidized, oxygen which has been lost during the reduction treatment is supplemented, and the stability as the oxide powder tends to increase. A method for the oxidation treatment is not particularly limited. For example, a method in which the ceria-zirconia composite oxide powder is heated in an oxidizing atmosphere (for example, air) can be preferably adopted. In addition, a heating temperature condition during the oxidation treatment is not particularly limited but is preferably about 300° C. to 800° C. Further, a heating time during the oxidation treatment is not particularly limited but is preferably about 0.5 hours to 5 hours.

In addition, in the specific example, after the reduction treatment or the oxidation treatment, it is preferable that the ceria-zirconia composite oxide powder be crushed. A method for the crushing treatment is not particularly limited. For example, a wet crushing method, a dry crushing method, or a. freezing and crushing method can be preferably adopted.

Next, in the method for producing a ceria-zirconia composite oxide according to the embodiment, at least one rare earth element selected from the group consisting of lanthanum (La), yttrium (Y), and praseodymium (Pr) is supported on the composite oxide powder obtained in the ceria-zirconia composite oxide powder preparing step (rare earth element supporting step).

In the embodiment, as the rare earth element (RE) which is supported on the ceria-zirconia composite oxide powder, at least one rare earth element selected from the lanthanum (La), yttrium (Y), and praseodymium (Pr) is necessarily used. That is, one rare earth element or a combination of two or more rare earth elements selected from the above group may be supported on the ceria-zirconia composite oxide powder. By using the rare earth element (RE) which is supported on the ceria-zirconia composite oxide powder, the oxygen storage capacity and the heat resistance of the obtained ceria-zirconia composite oxide are sufficiently excellent and highly well-balanced, and sufficiently excellent oxygen storage capacity can be exhibited even after exposure to a high temperature for a long period of time. As the rare earth element (RE) which is supported on the ceria-zirconia composite oxide powder, lanthanum (La) and praseodymium (Pr) are preferably used.

Regarding the amount of the rare earth element (RE) supported, a rate of a total content of the rare earth element (RE) in the obtained ceria-zirconia composite oxide to a total content of cerium and zirconium in the ceria-zirconia composite oxide is necessarily 0.1 at % to 4.0 at % and preferably 0.25 at % to 2.5 at %. When the content ratio of the rare earth element (RE) is less than the lower limit, the function of maintaining I(14/29) and OSC after a durability test tends to decrease. Therefore, an effect of obtaining excellent OSC and high heat resistance at the same time and exhibiting excellent OSC even after exposure to a high temperature for a long period of time cannot be sufficiently obtained. On the other hand, when the content ratio of the rare earth element is more than the upper limit, the function of maintaining I(14/29) and OSC after a durability test tends to decrease, and the effect of exhibiting excellent OSC is not sufficiently obtained.

A method of allowing at least one rare earth element selected from the group consisting of lanthanum (La), yttrium (Y), and praseodymium (Pr) to be supported on the ceria-zirconia composite oxide powder is not particularly limited. This supporting method is not particularly limited as long as the rare earth element (RE) can be supported on the ceria-zirconia composite oxide powder, and a well-known method may be appropriately adopted. For example, a liquid-phase method, a solid-phase method, and a gas-phase method which are commonly used may be used without any particular limitation, the liquid-phase method including an impregnation supporting method, an ion exchange method (for example, an adsorption supporting method), a water-absorption supporting method, a sol-gel method, and a precipitation supporting method (for example, a coprecipitation method); the solid-phase method including a powder mixing method and a solid ion exchange method; and the gas-phase method including a CVD method. Among these, an impregnation supporting method, a water-absorption method, and an ion exchange method are preferably used from the viewpoint of availability of raw materials of additive elements.

The supporting method of the rare earth element (RE) is not particularly limited, and it is preferable that the rare earth element be supported on the ceria-zirconia composite oxide such that the content of the rare earth element present in near-surface regions which are at a distance of less than 50 nm from surfaces of primary particles of the obtained ceria-zirconia composite oxide accounts for 90 at % or more of the total content of the rare earth element. To that end, a water-absorption method is preferably used because additive elements can be prevented from being diffused into the particles by measuring the water absorption amount, of the powder in advance and allowing the powder to absorb a raw material solution in which necessary amounts of the additive elements are dissolved.

A raw material (rare earth element source) of the rare earth element (RE) which is supported on the ceria-zirconia composite oxide according to the embodiment is not particularly limited, and a salt, a complex, a simple substance, an oxide, or the like of the rare earth element can be used. This rare earth element (RE) source can be appropriately selected according to the supporting method, conditions, and the like. Specifically, a salt of the rare earth element (RE) supported is used. For example, an inorganic acid salt such as a nitrate, a sulfate, or a hydrochloride or an organic acid salt such as an acetate can be used. The rare earth element (RE) source may be soluble or insoluble in a dispersion medium.

For example, for the supporting of the rare earth element (RE), first, an aqueous solution in which a salt or the like of the rare earth element (RE) is dissolved (for example, an aqueous lanthanum nitrate solution, an aqueous yttrium nitrate solution, or an aqueous praseodymium nitrate solution) is prepared. Next, the ceria-zirconia composite oxide powder is mixed with the aqueous solution containing the rare earth element (RE), followed by stirring at a predetermined temperature for a predetermined time to be impregnated with the rare earth element (RE). Next, the ceria-zirconia composite oxide powder impregnated with the rare earth element (RE) is filtered, washed, and dried. As a result, the ceria-zirconia composite oxide impregnated with the rare earth element (RE) according to the embodiment is obtained.

Alternatively, for the supporting of the rare earth element (RE), first, a dispersion of the ceria-zirconia composite oxide powder is prepared. For example, the ceria-zirconia composite oxide powder is suspended in ion exchange water to obtain the dispersion. Next, an aqueous solution of a rare earth element (RE) compound (for example, lanthanum nitrate) is prepared, and the ceria-zirconia composite oxide powder dispersion is mixed with the aqueous solution to prepare a mixed dispersion of the ceria-zirconia composite oxide powder and the rare earth element (RE) compound. Next, the mixed dispersion is spray-dried, washed, and dried. As a result, the ceria-zirconia composite oxide impregnated with the rare earth element (RE) according to the embodiment is obtained.

Conditions of such drying and the like are not particularly limited, and well-known conditions may be appropriately adopted. For example, as a drying condition, a condition of heating at 100° C. to 400° C. for 1 hour to 12 hours may be adopted.

Next, in the method for producing a ceria-zirconia composite oxide according to the embodiment, the ceria-zirconia composite oxide powder on which the rare earth element is supported, which is obtained in the rare earth element supporting step, is fired at 600° C. to 1200° C. to obtain the ceria-zirconia composite oxide according to the embodiment (firing step).

In the firing step of the ceria-zirconia composite oxide powder on which the rare earth element is supported, a firing temperature is necessarily in .a temperature of 600° C. to 1200° C., preferably 800° C. to 1100° C., and more preferably 900° C. to 1100° C. When the firing temperature is lower than the lower limit, the rare earth element supported tends not to be sufficiently reactive. On the other hand, when the firing temperature is higher than the upper limit, the $CeO_2$—$ZrO_2$ pyrochlore structure tends to deteriorate.

In addition, in the firing step, conditions (for example, a heat treatment atmosphere and time) of the firing treatment other than a firing method, a firing device, and a firing temperature are not particularly limited, and a well-known method, device, and conditions may be appropriately adopted. For example, as the firing device, a fluidizing-bed furnace, a muffle furnace, or a kiln may be used. In addition, the heating time in the firing step is preferably 3 hours to 20 hours and more preferably 4 hours to 10 hours although it varies depending on the firing temperature. In addition, as the heat treatment atmosphere, a well-known condition, for example, air, an atmosphere of inert gas containing air or oxygen, or an atmosphere of inert gas such as argon gas may be adopted. Alternatively, an oxidizing atmosphere (for example, air) is preferably adopted.

As described above, the ceria-zirconia composite oxide according to the embodiment can be obtained using the method for producing a ceria-zirconia composite oxide according to the embodiment.

Hereinabove, the ceria-zirconia composite oxide according to the embodiment and the method for producing the same have been described. Hereinafter, a catalyst for purifying exhaust gas according an embodiment of the invention in which the ceria-zirconia composite oxide is used will be described.

The catalyst for purifying exhaust gas according to the embodiment contains the ceria-zirconia composite oxide according to the embodiment. The catalyst for purifying exhaust gas according to the embodiment has sufficiently excellent oxygen storage capacity (OSC) and sufficiently high heat resistance at the same time and exhibits sufficiently excellent oxygen storage capacity (OSC) even after exposure to a high temperature for a long period of time.

As a preferable example of the catalyst for purifying exhaust gas according to the embodiment, a catalyst for purifying exhaust gas may be used, the catalyst including: a support that contains the ceria-zirconia composite oxide according to the embodiment; and a noble metal that is supported on the support. Examples of the noble metal include platinum, rhodium, palladium, osmium, iridium, gold, and silver. In addition, a method of supporting the noble metal on the support is not particularly limited, and a well-known method may be appropriately adopted. For example, a method may be adopted, the method including: dipping powder (support) of the ceria-zirconia composite oxide in a solution in which a salt (for example, a nitrate, a chloride, or an acetate) of the noble metal or a complex of the noble metal is dissolved in a solvent such as water or alcohol; removing the solvent; and firing the powder. In addition, the amount of the noble metal supported on the support is not particularly limited as long as a necessary amount of the noble metal is appropriately supported, but is preferably 0.01 mass %.

Further, as another preferable example of the catalyst for purifying exhaust gas according to the embodiment, a catalyst for purifying exhaust gas may be used, the catalyst being obtained by arranging the ceria-zirconia composite oxide according to the embodiment around a first catalyst that includes catalyst support particles and a noble metal supported on the catalyst support fine particles. The catalyst support particles are not particularly limited, and a support (for example, alumina particles, particles of alumina and ceria, or particles of alumina, ceria, and zirconia) including a metal oxide or a metal oxide composite which can be used as a support of a catalyst for purifying exhaust gas can be appropriately used. In addition, as a method of allowing the noble metal to be supported on the catalyst support particles, the above-described methods can be adopted. In addition, the amount of the noble metal supported on the catalyst support particles is not particularly limited as long as a necessary amount of the noble metal is appropriately supported, but is preferably 0.01 mass %. In addition, a method of arranging the ceria-zirconia composite oxide according to the embodiment around the first catalyst is not particularly limited. For example, a method of mixing the first catalyst and the ceria-zirconia composite oxide according to the embodiment can be adopted. Further, from the viewpoint of obtaining higher catalyst activity, it is preferable that the ceria-zirconia composite oxide according to the embodiment be arranged around the first catalyst in a state of being highly dispersed.

Hereinafter, the invention will be described in more detail using Examples and Comparative Examples but is not limited to the following Examples.

EXAMPLE 1

Ceria-zirconia solid solution powder in which a content ratio of cerium to zirconium was 46:54 by molar ratio was prepared as follows. That is, first, 452 g of an aqueous solution containing cerium nitrate in an amount of 28 mass % in terms of $CeO_2$, 590 g of an aqueous solution containing zirconium oxynitrate in an amount of 18 mass % in terms of $ZrO_2$, and 200 g of an aqueous solution containing hydrogen peroxide in an amount 1.1 times the molar amount of cerium to be contained were added to 321 g of an aqueous solution containing ammonia in an amount 1.2 times the neutralization equivalent to produce a coprecipitate. The obtained coprecipitate was centrifuged and washed (with ion exchange water). Next, the obtained coprecipitate was dried in the air at 110° C. for 10 hours or longer and was fired in the air at 400° C. for 5 hours to obtain a solid solution ($CeO_2$—$ZrO_2$ solid solution) of cerium and zirconium. Next, the solid solution was crushed into a particle size of 75 µm or less using a sieve with a crusher (manufactured by AS ONE Corporation, product name "Wonder Blender") to obtain the ceria-zirconia solid solution powder.

Next, a polyethylene bag (volume: 0.05 L) was packed with 20 g of the obtained ceria-zirconia solid solution powder, the inside thereof was degassed, and the mouth of the bag was heated to be sealed. Next, the bag was molded by cold isostatic pressing (CIP) using an isostatic press machine (manufactured by Nikkiso Co., Ltd., product name:

"CK4-22-60") under a pressure (molding pressure) of 2000 kgf/cm² for 1 minute. As a result, a molded article of the ceria-zirconia solid solution powder was obtained. The size of the molded article was as follows: a length of 4 cm; a width of 4 cm; and an average thickness of 7 mm, and the weight of the molded article was about 20 g.

Next, the obtained molded articles (two molded articles) were arranged inside a crucible (internal volume: a diameter of 8 cm, a height of 7 cm) filled with 70 g of activated carbon, and the crucible was covered with a lid. The crucible was put into a high speed heating electric furnace, was heated to 1000° C. for a heating time of 1 hour, was heated to 1700° C. for a heating time of 4 hours and held at this temperature for 5 hours, was cooled to 1000° C. for a cooling time of 4 hours, and was allowed to be cooled to room temperature. As a result, the molded article subjected to the reduction treatment was obtained.

Next, the molded article subjected to the reduction treatment was heated and oxidized in the air at a temperature condition of 500° C. for 5 hours. As a result, a ceria-zirconia composite oxide in which a content ratio of cerium to zirconium was 46:54 by molar ratio was obtained. The obtained ceria-zirconia composite oxide was crushed into a particle size of 75 μm or less using a sieve.

Next, an aqueous lanthanum nitrate solution containing lanthanum (La) in an amount of 0.25 at % with respect to a total amount of cerium and zirconium in the obtained ceria-zirconia composite oxide was prepared. Next, 10 g of the obtained ceria-zirconia composite oxide was put into the aqueous lanthanum nitrate solution, followed by stirring at room temperature for 1 hour. A predetermined amount of lanthanum was supported on the ceria-zirconia composite oxide using a water-absorption supporting method. Next, La supporting powder was separated by filtration, followed by drying in the air at 110° C. for 12 hours.

Next, the obtained La-supporting ceria-zirconia composite oxide was fired in the air at 900° C. for 5 hours. As a result, a particulate La-containing ceria-zirconia composite oxide was obtained.

Regarding the obtained particulate La-containing ceria-zirconia composite oxide, the structure and the form of particles were measured using HR-TEM (high-resolution transmission electron microscope), the composition analysis and the near-surface regions of particles were analyzed using EDX (energy-dispersive x-ray spectrometer), and the average particle size of primary particles were measured using a scanning electron microscopy (SEM) image. The average particle size of the primary particles was obtained by measuring particle sizes of arbitrary 50 primary particles through the observation of a scanning electron microscopy (SEM) image and calculating an average value of the particle sizes. If a cross-section of a particle was not circular, the diameter of a minimum circumscribed circle was measured. As a result, a rate of the content of lanthanum to the total content of cerium and zirconium in the La-containing ceria-zirconia composite oxide was 0.25 at %. In addition, the content of lanthanum present in near-surface regions which were at a distance of less than 50 nm from surfaces of primary particles of the La-supporting ceria-zirconia composite oxide accounted for 100 at % of the total content of lanthanum in the La-supporting ceria-zirconia composite oxide. In addition, the average particle size of primary particles of the obtained La-containing ceria-zirconia composite oxide was 3.0 μm.

<Durability Test 1> The obtained La-containing ceria-zirconia composite oxide (La-CZ composite oxide) was heated in the air under conditions of 1100° C. and 5 hours to perform a high-temperature durability test (1100° C. air).

<Durability Test 2> The obtained La-containing ceria-zirconia composite oxide (La-CZ composite oxide) was heated while allowing model gas to flow under conditions of 1050° C. and 5 hours to perform a high-temperature durability test (1050° C. RL). As a flowing condition of the model gas, rich gas (R) containing 8 vol % of CO in nitrogen and lean gas (L) containing 20 vol % of $O_2$ in nitrogen were alternately supplied on a 15-minute basis.

<X-Ray Diffraction (XRD) Measurement> Regarding a La-CZ composite Oxide (Fresh) obtained by performing no durability test on the obtained La-containing ceria-zirconia composite oxide, a La-CZ composite oxide subjected to durability test 1 (1100° C. air), and a La-CZ composite oxide subjected to durability test 2 (1050° C. RL), a crystal phase of each La-CZ composite oxide was measured using an X-ray diffraction method. By using "RINT-2100" (manufactured by Rigaku Corporation, product name: "RINT-2100") as an X-ray diffractometer, an X-ray diffraction pattern was measured under conditions (X-ray source: Cu-Kα ray ($\lambda$=0.15418 nm), tube voltage: 40 kV, tube current: 30 mA) to obtain the intensity ratio I(14/29) and the intensity ratio I(28/29). The obtained results are shown in Table 1, respectively.

<Measurement Test of Oxygen Absorbing and Releasing Amount: OSC Evaluation> Regarding a La-CZ composite oxide (Fresh) obtained by performing no durability test on the obtained La-containing ceria-zirconia composite oxide, a La-CZ composite oxide subjected to durability test 1 (1100° C. air), and a La-CZ composite oxide subjected to durability test 2 (1050° C. RL), 3 g of each La-CZ composite oxide and 1 g of $Pd/Al_2O_3$ catalyst on which Pd (0.25 wt %) was supported were physically mixed using a mortar, followed by compression-molding and crushing. As a result, a catalyst for purifying exhaust gas having a pellet form with a diameter of 0.5 mm to 1 mm was obtained.

15 mg of the obtained catalyst was weighed, and the oxygen absorbing and releasing amount thereof was measured using a thermogravimetric analyzer. The oxygen absorbing and releasing amount indicates the amount ($O_2$-mg/CZ-g) of oxygen absorbed and released at 400° C. per 1 g of CZ in the catalyst and was obtained from a reversible weight change using thermogravimetric analyzer (TG, manufactured by Ohkurariken Co., Ltd.) by placing the catalyst sample on a sample cell of the thermogravimetric analyzer and allowing gas containing $H_2$ (10 vol %) and $N_2$ (90 vol %) and gas containing Air ($O_2$: 21 vol %, $N_2$: 78 vol %) to alternately flow under a temperature condition of 400° C. on a 20-minute basis for 120 minutes at a flow rate of 200 ml/min with respect to 15 mg of the catalyst. For evaluation, a value of an oxygen releasing side (reduction side) was used. In this case, a theoretical limit value of the amount of oxygen released was 0.4 mg. The obtained results are shown in Table 1.

EXAMPLE 2

A particulate La-containing ceria-zirconia composite oxide was obtained with the same method as that of Example 1, except that an aqueous lanthanum nitrate solution containing lanthanum (La) in an amount of 0.5 at % with respect to a total amount of cerium and zirconium in the ceria-zirconia composite oxide was prepared and used in the rare earth element supporting step.

Regarding the obtained particulate La-containing ceria-zirconia composite oxide, the HR-TEM observation, the EDX analysis, and the SEM observation were performed with the same method as that of Example 1. The result was that the content rate of lanthanum in the La-containing ceria-zirconia composite oxide was 0.5 at % with respect to the total content of cerium and zirconium. In addition, the content of lanthanum present in near-surface regions which were at a distance of less than 50 nm from surfaces of primary particles of the La-supporting ceria-zirconia composite oxide accounted for 100 at % of the total content of lanthanum in the La-supporting ceria-zirconia composite oxide. In addition, the average particle size of primary particles of the obtained La-containing ceria-zirconia composite oxide was 3.2 μm.

In addition, regarding the obtained La-containing ceria-zirconia composite oxide, the durability tests, the X-ray diffraction measurement, and the measurement of oxygen absorbing and releasing amount were performed with the same method as that of Example 1. The obtained results are shown in Table 1.

Figure 1:
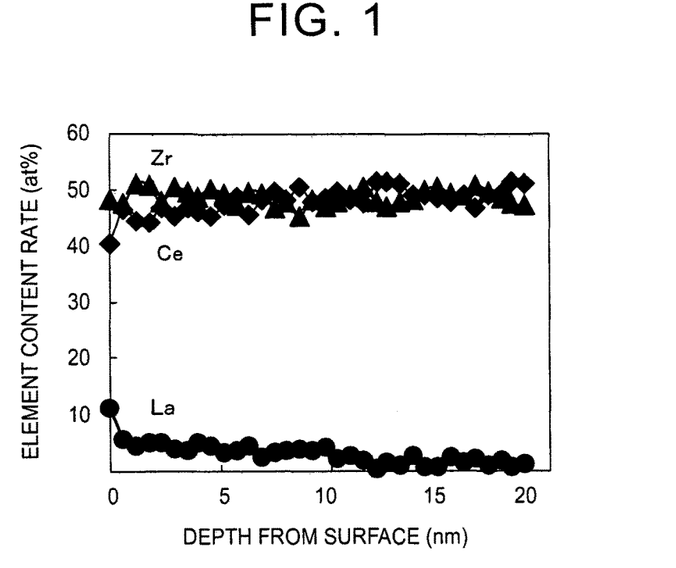
FIG. 1 is a graph illustrating the results of EDX analysis of a La-CZ composite oxide (subjected to duration test 1) prepared in Example 2 according to the invention.
Figure 2:
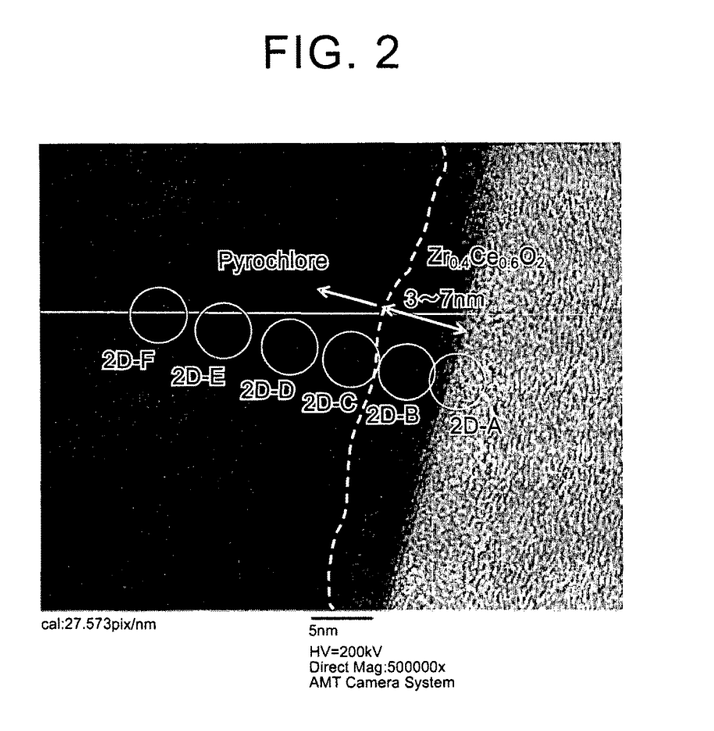
FIG. 2 is a high-resolution transmission electron microscopy (HR-TEM) image of the La-CZ composite oxide (subjected to duration test 1) prepared in Example 2 according to the invention.

FIG. 1 illustrates the results of the EDX analysis of the primary particles of the La-containing ceria-zirconia composite oxide subjected to durability test 1 (1100° C. air), and FIG. 2 illustrates the results of the HR-TEM (high-resolution transmission electron microscope) observation thereof. It was clearly confirmed from FIGS. 1 and 2 that, in the La-containing ceria-zirconia composite oxide of the example according to the invention, particle surfaces were changed from the $CeO_2$—$ZrO_2$ pyrochlore structure to the $CeO_2$—$ZrO_2$ cubic crystal at a depth of 3 nm to 7 nm.

EXAMPLE 3

A particulate Y-containing ceria-zirconia composite oxide was obtained with the same method as that of Example 1, except that an aqueous yttrium nitrate solution containing yttrium (Y) in an amount of 0.5 at % with respect to a total amount of cerium and zirconium in the ceria-zirconia composite oxide was prepared and used in the rare earth element supporting step.

Regarding the obtained particulate Y-containing ceria-zirconia composite oxide, the HR-TEM observation, the EDX analysis, and the SEM observation were performed with the same method as that of Example 1. The result was that the content rate of yttrium in the Y-containing ceria-zirconia composite oxide was 0.5 at % with respect to the total content of cerium and zirconium. In addition, the content of yttrium present in near-surface regions which were at a distance of less than 50 nm from surfaces of primary particles of the Y-supporting ceria-zirconia composite oxide accounted for 95 at % of the total content of yttrium in the Y-supporting ceria-zirconia composite oxide. In addition, the average particle size of primary particles of the obtained Y-containing ceria-zirconia composite oxide was 3.1 μm.

In addition, regarding the obtained Y-containing ceria-zirconia composite oxide, the durability tests, the X-ray diffraction measurement, and the measurement of oxygen absorbing and releasing amount were performed with the same method as that of Example 1. The obtained results are shown in Table 1.

EXAMPLE 4

A particulate Pr-containing ceria-zirconia composite oxide was obtained with the same method as that of Example 1, except that an aqueous praseodymium nitrate solution containing praseodymium (Pr) in an amount of 0.5 at % with respect to a total amount of cerium and zirconium in the ceria-zirconia composite oxide was prepared and used in the rare earth element supporting step.

Regarding the obtained particulate Pr-containing ceria-zirconia composite oxide, the HR-TEM observation, the EDX analysis, and the SEM observation were performed with the same method as that of Example 1. The result was that the content rate of praseodymium in the Pr-containing ceria-zirconia composite oxide was 0.5 at % with respect to the total content of cerium and zirconium. In addition, the content of praseodymium present in near-surface regions which were at a distance of less than 50 nm from surfaces of primary particles of the Pr-supporting ceria-zirconia composite oxide accounted for 100 at % of the total content of praseodymium in the Pr-supporting ceria-zirconia composite oxide. In addition, the average particle size of primary particles of the obtained Pr-containing ceria-zirconia composite oxide was 3.3 μm.

In addition, regarding the obtained Pr-containing ceria-zirconia composite oxide, the durability tests, the X-ray diffraction measurement, and the measurement of oxygen absorbing and releasing amount were performed with the same method as that of Example 1. The obtained results are shown in Table 1.

EXAMPLE 5

A particulate La-containing ceria-zirconia composite oxide was obtained with the same method as that of Example 1, except that an aqueous lanthanum nitrate solution containing lanthanum (La) in an amount of 0.5 at % with respect to a total amount of cerium and zirconium in the ceria-zirconia composite oxide was prepared and used in the rare earth element supporting step and the firing temperature was set as 1100° C. in the firing step.

Regarding the obtained particulate La-containing ceria-zirconia composite oxide, the. HR-TEM observation, the EDX analysis, and the SEM observation were performed with the same method as that of Example 1. The result was that the content rate of lanthanum in the La-containing ceria-zirconia composite oxide was 0.5 at % with respect to the total content of cerium and zirconium. In addition, the content of lanthanum present in near-surface regions which were at a distance of less than 50 nm from surfaces of primary particles of the La-supporting ceria-zirconia composite oxide accounted for 100 at % of the total content of lanthanum in the La-supporting ceria-zirconia composite oxide. In addition, the average particle size of primary particles of the obtained La-containing ceria-zirconia composite oxide was 3.4 μm.

In addition, regarding the obtained La-containing ceria-zirconia composite oxide, the durability tests, the X-ray diffraction measurement, and the measurement of oxygen absorbing and releasing amount were performed with the same method as that of Example 1. The obtained results are shown in Table 1.

Figure 3:
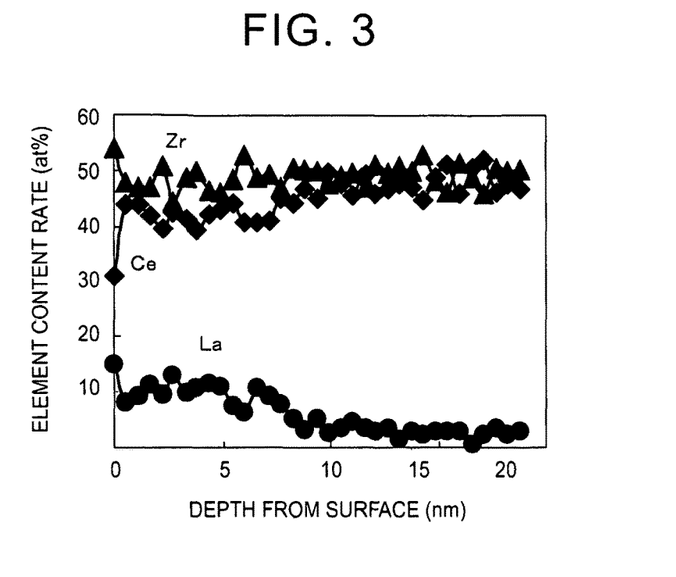
FIG. 3 is a graph illustrating the results of EDX analysis of a La-CZ composite oxide (subjected to duration test 1) prepared in Example 5 according to the invention.
Figure 4:
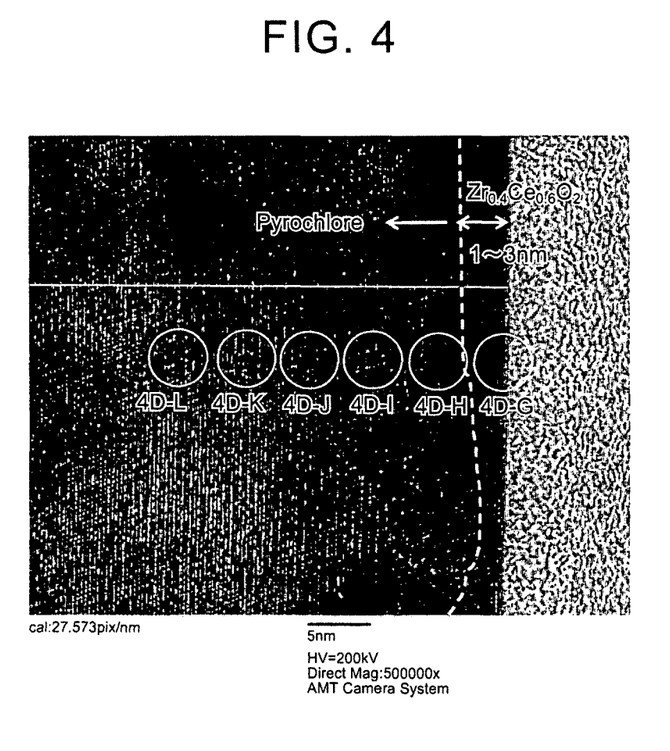
FIG. 4 is a high-resolution transmission electron microscopy (HR-TEM) image of the La-CZ composite oxide (subjected to duration test 1) prepared in Example 5 according to the invention.

FIG. 3 illustrates the results of the EDX analysis of the primary particles of the La-containing ceria-zirconia composite oxide subjected to durability test 1 (1100° C. air), and FIG. 4 illustrates the results of the HR-TEM (high-resolution transmission electron microscope) observation thereof. It was clearly confirmed from FIGS. 3 and 4 that, in the La-containing ceria-zirconia composite oxide of the example according to the invention, particle surfaces were changed from the $CeO_2$—$ZrO_2$ pyrochlore structure to the $CeO_2$—$ZrO_2$ cubic crystal at a depth of 1 nm to 3 nm.

EXAMPLE 6

A particulate La-containing ceria-zirconia composite oxide was obtained with the same method as that of Example 1, except that an aqueous lanthanum nitrate solution containing lanthanum (La) in an amount of 1.0 at % with respect to a total amount of cerium and zirconium in the ceria-zirconia composite oxide was prepared and used in the rare earth element supporting step.

Regarding the obtained particulate La-containing ceria-zirconia composite oxide, the HR-TEM observation, the EDX analysis, and the SEM observation were performed with the same method as that of Example 1. The result was that the content rate of lanthanum in the La-containing ceria-zirconia composite oxide was 1.0 at % with respect to the total content of cerium and zirconium. In addition, the content of lanthanum present in near-surface regions which were at a distance of less than 50 nm from surfaces of primary particles of the La-supporting ceria-zirconia composite oxide accounted for 100 at % of the total content of lanthanum in the La-supporting ceria-zirconia composite oxide. In addition, the average particle size of primary particles of the obtained La-containing ceria-zirconia composite oxide was 3.3 µM.

In addition, regarding the obtained La-containing ceria-zirconia composite oxide, the durability tests, the X-ray diffraction measurement, and the measurement of oxygen absorbing and releasing amount were performed with the same method as that of Example 1. The obtained results are shown in Table 1.

EXAMPLE 7

A particulate La-containing ceria-zirconia composite oxide was obtained with the same method as that of Example 1, except that an aqueous lanthanum nitrate solution containing lanthanum (La) in an amount of 2.5 at % with respect to a total amount of cerium and zirconium in the ceria-zirconia composite oxide was prepared and used in the rare earth element supporting step.

Regarding the obtained particulate La-containing ceria-zirconia composite oxide, the HR-TEM observation, the EDX analysis, and the SEM observation were performed with the same method as that of Example 1. The result was that the content rate of lanthanum in the La-containing ceria-zirconia composite oxide was 2.5 at % with respect to the total content of cerium and zirconium. In addition, the content of lanthanum present in near-surface regions which were at a distance of less than 50 nm from surfaces of primary particles of the La-supporting ceria-zirconia composite oxide accounted for 100 at % of the total content of lanthanum in the La-supporting ceria-zirconia composite oxide. In addition, the average particle size of primary particles of the obtained La-containing ceria-zirconia composite oxide was 3.6 µm.

In addition, regarding the obtained La-containing ceria-zirconia composite oxide, the durability tests, the X-ray diffraction measurement, and the measurement of oxygen absorbing and releasing amount were performed with the same method as that of Example 1. The obtained results are shown in Table 1.

Figure 5:
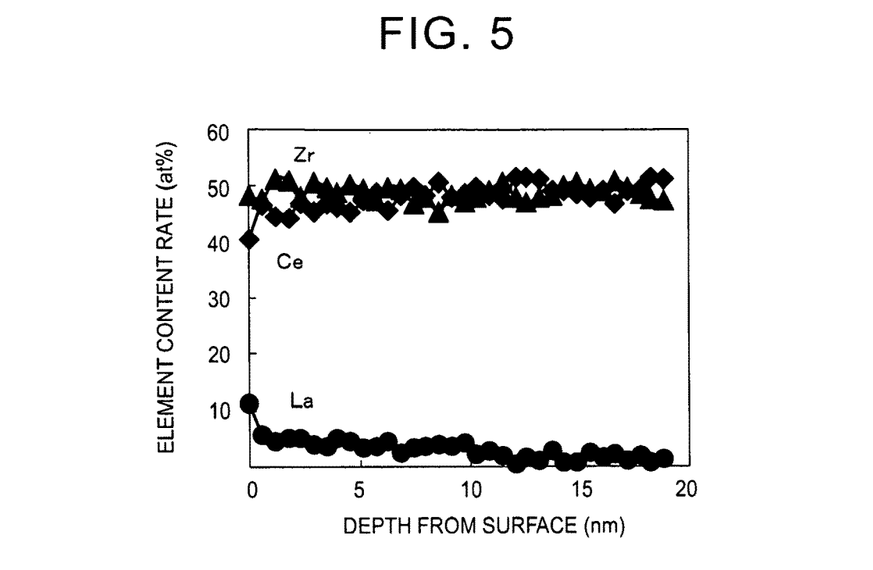
FIG. 5 is a graph illustrating the results of EDX analysis of a La-CZ composite oxide (subjected to duration test 1) prepared in Example 7 according to the invention.
Figure 6:
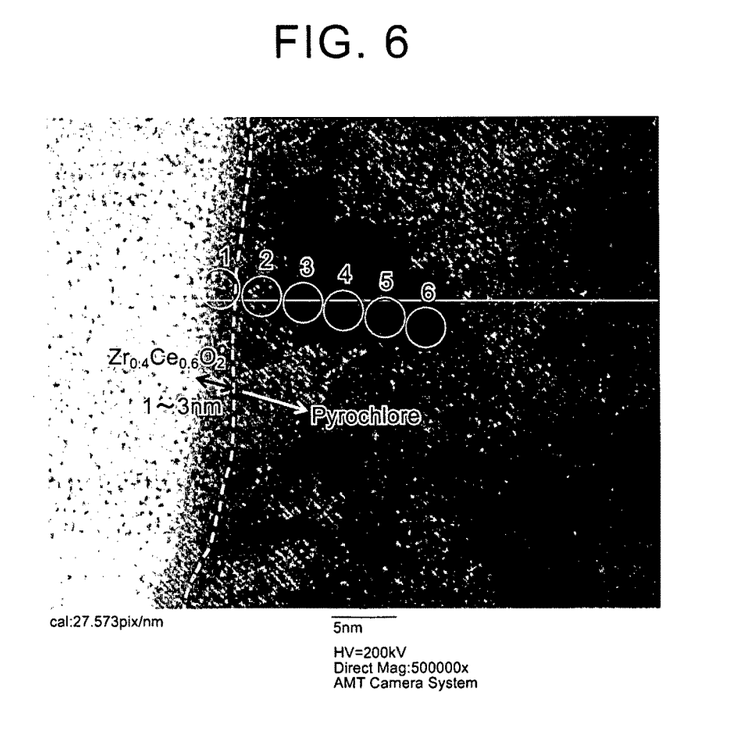
FIG. 6 is a high-resolution transmission electron microscopy (HR-TEM) image of the La-CZ composite oxide (subjected to duration test 1) prepared in Example 7 according to the invention.

FIG. 5 illustrates the results of the EDX analysis of the primary particles of the La-containing ceria-zirconia composite oxide subjected to durability test 1 (1100° C. air), and FIG. 6 illustrates the results of the HR-TEM (high-resolution transmission electron microscope) observation thereof. It was clearly confirmed from FIGS. 5 and 6 that, in the La-containing ceria-zirconia composite oxide of the example according to the invention, particle surfaces were changed from the $CeO_2$—$ZrO_2$ pyrochlore structure to the $CeO_2$—$ZrO_2$ cubic crystal at a depth of 1 nm to 3 nm.

COMPARATIVE EXAMPLE 1

The ceria-zirconia composite oxide (on which lanthanum was not supported and which was not fired) obtained in Example 1 was prepared as a particulate ceria-zirconia composite oxide for comparison.

Regarding the obtained ceria-zirconia composite oxide for comparison, the HR-TEM observation, the EDX analysis, and the SEM observation were performed with the same method as that of Example 1. The result was that the content rate of the rare earth element in the ceria-zirconia composite oxide for comparison was 0.0 at % with respect to the total content of cerium and zirconium. In addition, the average particle size of primary particles of the obtained ceria-zirconia composite oxide for comparison was 3.2 µm.

In addition, regarding the obtained ceria-zirconia composite oxide for comparison, the durability tests, the X-ray diffraction measurement, and the measurement of oxygen absorbing and releasing amount were performed with the same method as that of Example 1. The obtained results are shown in Table 1.

Figure 7:
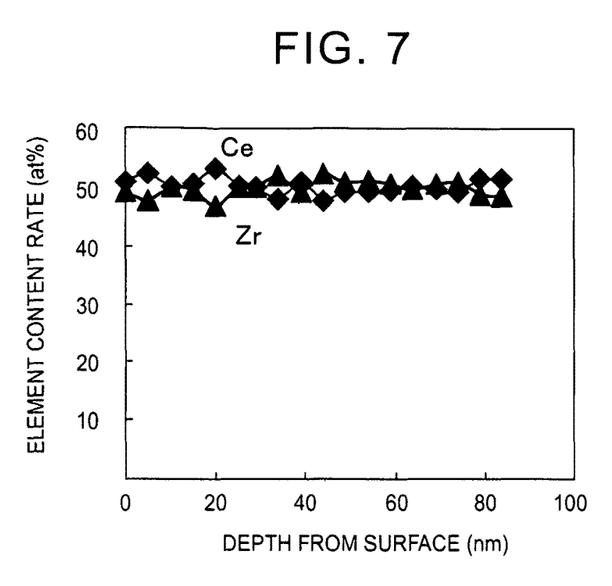
FIG. 7 is a graph illustrating the results of EDX analysis of a ceria-zirconia composite oxide (subjected to duration test 1) for comparison prepared in Comparative Example 1.
Figure 8:
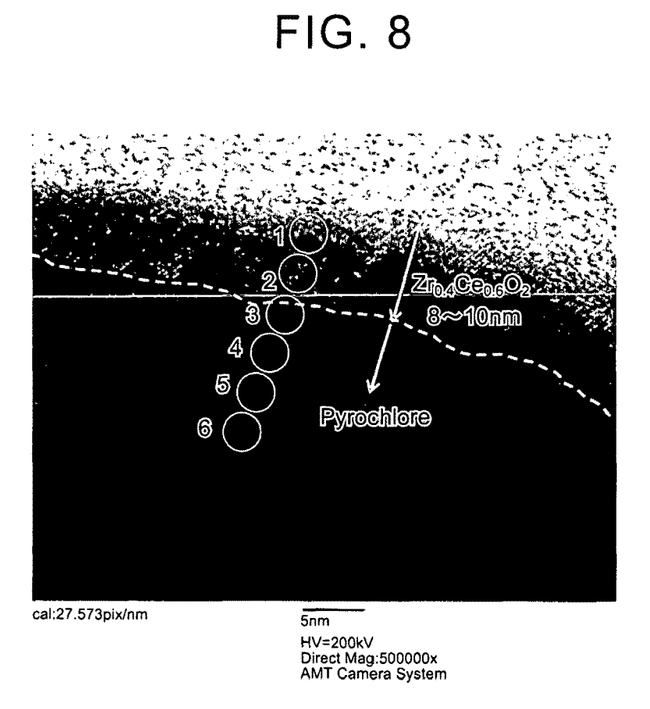
FIG. 8 is a high-resolution transmission electron microscopy (HR-TEM) image of the ceria-zirconia composite oxide (subjected to duration test 1) for comparison prepared in Comparative Example 1.

FIG. 7 illustrates the results of the EDX analysis of the primary particles of the ceria-zirconia composite oxide for comparison subjected to durability test 1 (1100° C. air), and FIG. 8 illustrates the results of the HR-TEM (high-resolution transmission electron microscope) observation thereof. It was clearly confirmed from FIGS. 7 and 8 that, in the ceria-zirconia composite oxide for comparison, particle surfaces were changed from the $CeO_2$—$ZrO_2$ pyrochlore structure to the $CeO_2$—$ZrO_2$ cubic crystal at a depth of 8 nm to 10 nm.

COMPARATIVE EXAMPLE 2

A particulate La-containing ceria-zirconia composite oxide was obtained with the same method as that of Example 1, except that an aqueous lanthanum nitrate solution containing lanthanum (La) in an amount of 5.0 at % with respect to a total amount of cerium and zirconium in the ceria-zirconia composite oxide was prepared and used in the rare earth element supporting step.

Regarding the obtained particulate La-containing ceria-zirconia composite oxide, the HR-TEM observation, the EDX analysis, and the SEM observation were performed with the same method as that of Example 1. The result was that the content rate of lanthanum in the La-containing ceria-zirconia composite oxide was 5.0 at % with respect to the total content of cerium and zirconium. In addition, the content of lanthanum present in near-surface regions which were at a distance of less than 50 nm from surfaces of primary particles of the La-supporting ceria-zirconia composite oxide accounted for 89 at % of the total content of lanthanum in the La-supporting ceria-zirconia composite oxide. In addition, the average particle size of primary particles of the obtained La-containing ceria-zirconia composite oxide was 3.5 µm.

In addition, regarding the obtained La-containing ceria-zirconia composite oxide, the durability tests, the X-ray diffraction measurement, and the measurement of oxygen absorbing and releasing amount were performed with the same method as that of Example 1. The obtained results are shown in Table 1.

COMPARATIVE EXAMPLE 3

A particulate Fe-containing ceria-zirconia composite oxide was obtained with the same method as that of Example 1, except that iron was used instead of lanthanum in the rare earth element (lanthanum) supporting step and an aqueous iron nitrate solution containing iron (Fe) in an amount of 2.5 at % with respect to a total amount of cerium and zirconium in the ceria-zirconia composite oxide was prepared and used.

Regarding the obtained particulate Fe-containing ceria-zirconia composite oxide, the HR-TEM observation, the EDX analysis, and the SEM observation were performed with the same method as that of Example 1. The result was that the content rate of iron in the Fe-containing ceria-zirconia composite oxide was 2.5 at % with respect to the total content of cerium and zirconium. In addition, the content of iron present in near-surface regions which were at a distance of less than 50 nm from surfaces of primary particles of the Fe-supporting ceria-zirconia composite oxide accounted for 92 at % of the total content of iron in the Fe-supporting ceria-zirconia composite oxide. In addition, the average particle size of primary particles of the obtained Fe-containing ceria-zirconia composite oxide was 3.1 μm.

In addition, regarding the obtained Fe-containing ceria-zirconia composite oxide, the durability tests, the X-ray diffraction measurement, and the measurement of oxygen absorbing and releasing amount were performed with the same method as that of Example 1. The obtained results are shown in Table 1.

element (Examples 1 to 7), sufficiently excellent oxygen storage capacity (OSC) and sufficiently high heat resistance can be obtained at the same time, and sufficiently excellent oxygen storage capacity (OSC) can be exhibited even after exposure to a high temperature for a long period of time.

It can also be confirmed that when the content of the added rare earth element is out of the range (Comparative Examples 1 and 2), the intensity ratio I(14/29) and oxygen storage capacity (OSC) after the durability tests are poor.

In addition, it can also be confirmed that, in the ceria-zirconia composite oxide (Comparative Example 3) containing Fe instead of a specific rare earth element, the intensity ratio I(14/29) which is the ratio of the ordered pyrochlore phase maintained tends to be retained, but the intensity ratio I(28/29) which is the index indicating the degree of phase separation of $CeO_2$ from a composite oxide is large and deterioration of OSC is large.

As described above, according to the embodiments, it is possible to provide a ceria-zirconia composite oxide, a method for producing the same, and a catalyst for purifying exhaust gas using the ceria-zirconia composite oxide, the ceria-zirconia composite oxide having sufficiently excellent oxygen storage capacity (OSC) and sufficiently excellent heat resistance at the same time and being capable of exhibiting sufficiently excellent oxygen storage capacity (OSC) even after exposure to a high temperature for a long period of time.

In this way, the ceria-zirconia composite oxide according to the embodiment has sufficiently excellent oxygen storage capacity (OSC) and sufficiently high heat resistance at the same time and thus can be desirably used as a support, a co-catalyst, a catalyst atmosphere controlling material, and the like for a catalyst for purifying exhaust gas.

TABLE 1

| | Additive Element | | After Water-Absorption Supporting | Oxygen Absorbing and Releasing Amount (OSC) at 400° C. ($O_2$-mg/Ca-g) | | | Intensity Ratio I(14/29) | | | Intensity Ratio I(28/29) | | |
|---|---|---|---|---|---|---|---|---|---|---|---|---|
| | Element | Added Amount [at %] | Firing Temperature [° C.] | Fresh | 1100° C. Air | 1050° C. RL | Fresh | 1100° C. Air | 1050° C. RL | Fresh | 1100° C. Air | 1050° C. RL |
| Example 1 | La | 0.25 | 900 | 25.0 | 22.7 | 19.5 | 0.040 | 0.033 | 0.023 | 0.007 | 0.010 | 0.009 |
| Example 2 | La | 0.5 | 900 | 23.5 | 23.2 | 19.8 | 0.037 | 0.032 | 0.023 | 0.006 | 0.012 | 0.010 |
| Example 3 | Y | 0.5 | 900 | 25.0 | 22.5 | 19.5 | 0.040 | 0.032 | 0.023 | 0.006 | 0.013 | 0.010 |
| Example 4 | Pr | 0.5 | 900 | 23.0 | 22.0 | 19.8 | 0.036 | 0.032 | 0.024 | 0.007 | 0.012 | 0.009 |
| Example 5 | La | 0.5 | 1100 | 21.5 | 21.5 | 21.0 | 0.032 | 0.032 | 0.026 | 0.005 | 0.014 | 0.011 |
| Example 6 | La | 1.0 | 900 | 23.3 | 21.0 | 20.0 | 0.038 | 0.037 | 0.023 | 0.004 | 0.012 | 0.012 |
| Example 7 | La | 2.5 | 900 | 24.0 | 21.2 | 19.0 | 0.041 | 0.036 | 0.025 | 0.003 | 0.015 | 0.011 |
| Comparative Example 1 | La | 0 | — | 23.5 | 18.5 | 19.0 | 0.039 | 0.031 | 0.022 | 0.008 | 0.009 | 0.008 |
| Comparative Example 2 | La | 5.0 | 900 | 21.0 | 16.5 | 16.5 | 0.036 | 0.031 | 0.019 | 0.005 | 0.015 | 0.012 |
| Comparative Example 3 | Fe | 2.5 | 900 | 22.0 | 15.4 | 15.8 | 0.370 | 0.032 | 0.019 | 0.005 | 0.082 | 0.094 |

<Results of Evaluation Tests> From the comparison of the results of Examples 1 to 7 and the results of Comparative Examples 1 to 3 shown in Table 1, the following can be clearly confirmed: when a rate of the content of the added rare earth element to the total content of cerium and zirconium in the rare earth element-containing ceria-zirconia composite oxide is in a range of 0.1 at % to 4.0 at %, and when the content of the rare earth element present in near-surface regions which are at a distance of less than 50 nm from surfaces of primary particles of the rare-earth element-containing ceria-zirconia composite oxide accounts for 90 at % or more of the total content of the rare earth

The invention claimed is:
1. A ceria-zirconia composite oxide containing a composite oxide of ceria and zirconia, comprising
   lanthanum, wherein
   a ratio of a total content of lanthanum to a total content of cerium and zirconium in the ceria-zirconia composite oxide is 0.25 atomic % to 2.5 atomic %,
   a content of lanthanum present in near-surface regions accounts for 90 atomic % or more of the total content of lanthanum, the near-surface regions being at a distance of less than 50 nm from surfaces of primary particles of the ceria-zirconia composite oxide, a content ratio of cerium to zirconium in the ceria-zirconia composite oxide is in a range from 43:57 to 48:52 by molar ratio, an average particle size of the primary particles of the ceria-zirconia composite oxide is 2.2 µm to 4.5 µm, and an intensity ratio I(14/29) of a diffraction line at 2θ=14.5° to a diffraction line at 2θ=29° and an intensity ratio I(28/29) of a diffraction line at 2θ=28.5° to the diffraction line at 2θ=29° respectively satisfy the following conditions:

$I(14/29) \geq 0.02$; and $I(28/29) \leq 0.08$, wherein the intensity ratio I(14/29) and the intensity ratio I(28/29) are calculated from an X-ray diffraction pattern of the ceria-zirconia composite oxide, the X-ray diffraction pattern being obtained by an X-ray diffraction measurement using CuKα after heating the ceria-zirconia composite oxide under a temperature condition of 1100° C. in air for 5 hours.

2. A method for producing a ceria-zirconia composite oxide containing a composite oxide of ceria and zirconia, the method comprising:

preparing ceria-zirconia composite oxide powder in which a content ratio of cerium to zirconium is in a range from 43:57 to 48:52 by molar ratio and an average particle size of primary particles of the ceria-zirconia composite oxide powder is 2.2 µm 4.5 µm;

allowing lanthanum to be supported on the ceria-zirconia composite oxide powder; and firing the ceria-zirconia composite oxide powder on which lanthanum is supported at 600° C. to 1200° C. to obtain the ceria-zirconia composite oxide according to claim 1.

3. A catalyst for purifying exhaust gas comprising the ceria-zirconia composite oxide according to claim 1.

* * * * *

UNITED STATES PATENT AND TRADEMARK OFFICE
CERTIFICATE OF CORRECTION

PATENT NO. : 10,112,180 B2
APPLICATION NO. : 15/026760
DATED : October 30, 2018
INVENTOR(S) : Akira Morikawa et al.

Page 1 of 1

It is certified that error appears in the above-identified patent and that said Letters Patent is hereby corrected as shown below:

In the Specification

Column 19, Line 27; delete "3.3 µM." and insert --3.3 µm.--

In the Claims

Column 23, Lines 11-12; In Claim 1, delete "$I(14/29) \geq 0.02$;" and insert --$I(14/29) \geq 0.032$;--

Column 23, Lines 13-14; In Claim 1, delete "$I(28/29) \leq 0.08$," and insert --$I(28/29) \leq 0.08$,-- therefor Column 24, Line 10; In Claim 2, after "2.2 µm", insert --to--

Signed and Sealed this
Twenty-second Day of December, 2020

Andrei Iancu
*Director of the United States Patent and Trademark Office*